(12) United States Patent
Wimmer et al.

(10) Patent No.: US 7,182,563 B2
(45) Date of Patent: Feb. 27, 2007

(54) FASTENER

(75) Inventors: Karin Wimmer, Bad Nauheim (DE); Rupert Becker, Muecke (DE); Thomas Schmidt, Haverlah (DE); Johann Reindl, Biebartel (DE)

(73) Assignee: Newfrey LLC, Newark, DE (US)

( * ) Notice: Subject to any disclaimer, the term of this patent is extended or adjusted under 35 U.S.C. 154(b) by 39 days.

(21) Appl. No.: 11/003,014

(22) Filed: Dec. 2, 2004

(65) Prior Publication Data

US 2005/0129481 A1    Jun. 16, 2005

(30) Foreign Application Priority Data

Dec. 11, 2003 (DE) ............................. 103 58 379

(51) Int. Cl.
*F16B 37/08* (2006.01)
(52) U.S. Cl. ..................... 411/174; 411/5; 411/433
(58) Field of Classification Search ............ 411/174, 411/175, 172, 112, 433, 437, 5, 3, 2
See application file for complete search history.

(56) References Cited

U.S. PATENT DOCUMENTS

| | | | | |
|---|---|---|---|---|
| 3,009,499 A | * | 11/1961 | Weihe | 411/112 |
| 3,670,796 A | * | 6/1972 | Grimm | 411/112 |
| 3,999,583 A | * | 12/1976 | Nelson | 411/182 |
| 4,286,642 A | * | 9/1981 | Keatley | 411/112 |
| 4,396,326 A | * | 8/1983 | McKinnie et al. | 411/103 |
| 4,674,931 A | | 6/1987 | Schwind et al. | |
| 4,729,706 A | | 3/1988 | Peterson et al. | |
| 4,781,504 A | | 11/1988 | Yuta | |
| 4,798,507 A | | 1/1989 | Olah | |
| 4,955,772 A | | 9/1990 | Reck | |
| 5,098,242 A | * | 3/1992 | Schaty | 411/437 |
| 5,865,581 A | * | 2/1999 | Sadri et al. | 411/5 |
| 6,109,848 A | * | 8/2000 | Werner | 411/5 |

FOREIGN PATENT DOCUMENTS

| | | |
|---|---|---|
| DE | 1059722 | 6/1959 |
| EP | 0353468 | 2/1990 |
| JP | 11294428 | 10/1999 |

* cited by examiner

*Primary Examiner*—Flemming Saether
(74) *Attorney, Agent, or Firm*—Harness, Dickey & Pierce, P.L.C.

(57) ABSTRACT

A fastener for fastening a component having a mounting hole has an essentially U-shaped clamping region that at least partially grips around the component and has two opposing legs that are connected together as a single piece by a connecting region. The legs are provided with through holes that serve to accommodate a pin or stud that passes through the mounting hole of the component. A nut is attached to a first leg on the side facing away from the second leg such that the connection between the first leg and the nut can be released by a separating force acting on the nut.

18 Claims, 6 Drawing Sheets

FASTENER

CROSS-REFERENCE TO RELATED APPLICATIONS

This application claims the benefit German Patent Application No. 10358379.3, filed Dec. 11, 2003. The disclosure of the above application is incorporated herein by reference.

FIELD OF THE INVENTION

The invention concerns a fastener for fastening a component that has a mounting hole, wherein the fastener has an essentially U-shaped clamping region that at least partially grips around the component and has two opposing legs that are connected together as a single piece by a connecting region, wherein the legs are provided with through holes that serve to accommodate a pin or stud that passes through the mounting hole of the component and is equipped with threads.

BACKGROUND OF THE INVENTION

Already known from the document EP 0,353,468 B1 is a fastener of the specified type that has a threaded bushing which is embodied directly on one of the legs, wherein the threaded bushing initially has a smooth inner wall. A screw that automatically forms a thread in the threaded bushing while being screwed in is used as the connecting element. In numerous applications, particularly in applications in motor vehicles, the problem is encountered that connections should be released without destroying the connecting element so that reuse thereof is possible. Moreover, the difficulty often arises in this context that one side of the connection is no longer accessible. Frequently, and especially when interior trim, fixtures or operating components are fastened, the head of the connecting element in which a removal tool can engage is no longer accessible and thus can no longer be removed. possible. Moreover, the difficulty often arises in this context that one side of the connection is no longer accessible. Frequently, and especially when interior trim, fixtures or operating components are fastened, the head of the connecting element in which a removal tool can engage is no longer accessible and thus can no longer be removed.

SUMMARY OF THE INVENTION

The object of the invention is to create a fastener for fastening a component having a mounting hole wherein the connection can be released when one side of the connecting element is inaccessible or immovable, without destroying the fastener such that reuse is impossible.

The object is attained in accordance with the invention in that a nut is attached to a first leg on the side facing away from the second leg such that the connection between the first leg and the nut can be released by means of a separating force acting on the nut.

The fastener according to the invention has, in particular, the advantage that the connection can be released and reestablished even when the head of the connecting element in which a tool can engage is no longer accessible. It is also advantageous that the fastener according to the invention is simple to manufacture.

The object is further attained in accordance with the invention by the method for fastening a component having a mounting hole through the features of claim 12.

Moreover, the fastener according to the invention and the method according to the invention for fastening a component having a mounting hole serve to save material, since the fastener can be used to fasten the component multiple times. In addition, the method according to the invention is advantageous in that the method is simple to carry out and has a reliable result.

The measures described in the dependent claims make possible advantageous refinements and improvements of the fastener according to claim 1 and the method for fastening according to claim 12. It is especially advantageous to choose a torque as a separating force, since tools suitable for this purpose are available and are also used for other applications in fastening components. It is further advantageous to design the inner surface of the nut to be smooth, so that the pin or stud used for fastening cuts the thread when being screwed in. By this means the field of application of the fastener is expanded for a variety of thread types, and in addition more secure fastening of the component is achieved. It is particularly advantageous to arrange latching bodies in the bore that resiliently rest against a pin or stud located in the bore and block a movement of the pin or stud toward the clamping region, viewed from the nut, while permitting movement of the pin or stud in the opposite direction. This embodiment makes it possible to simply push the fastener onto the pin or stud, which establishes a solid connection. Furthermore, the advantageous connection of the nut to the first leg by means of webs provided with predefined breaking points achieves the result that the fastener can be manufactured in a simple and material-saving manner. In order to release the connection between the fastener and the component in a simple and reliable manner. and remove the fastener, the fastener has two lateral tabs on one of the legs that can be gripped when releasing or fastening the fastener. A centering projection that is advantageously provided on the fastener and that projects in the direction of the respective other leg makes it possible to at least briefly fix the fastener in place in the pushed-on state even without employing the pin or stud that passes through it, and additional retaining means are not needed. The advantageous chamfers on the centering projection or on both legs facilitate the insertion of the component between the two legs of the fastener.

The fastener according to the invention is preferably made of plastic and is preferably manufactured by injection molding.

BRIEF DESCRIPTION OF THE DRAWINGS

Example embodiments of the invention are shown in drawings and explained in detail in the description below. The drawings show.

DETAILED DESCRIPTION

Figure 1:
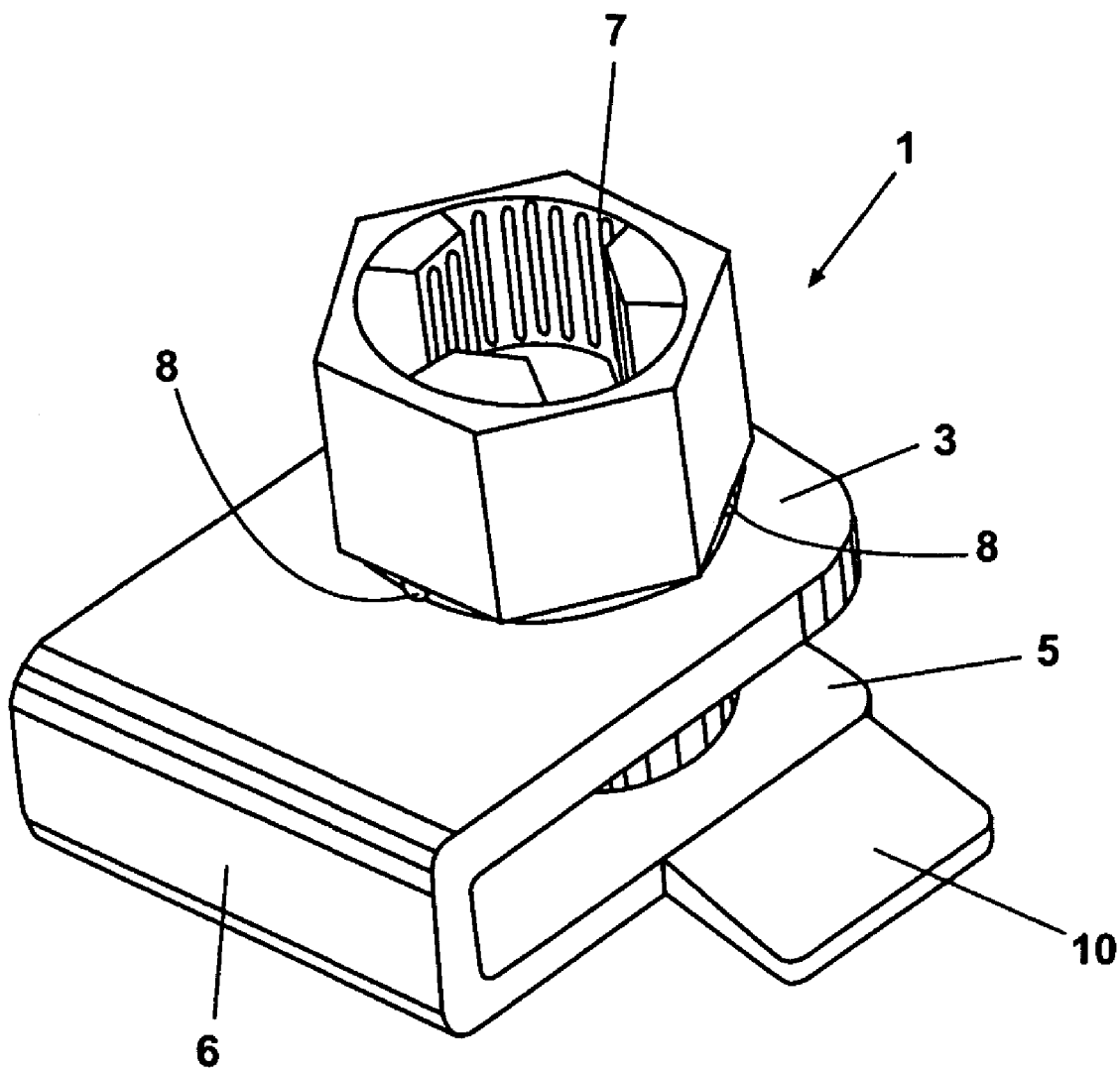
FIG. 1 a perspective view from above and at an angle of a fastener according to the invention.

FIG. 1 shows a perspective view from above and at an angle of a fastener 1 according to the invention. The fastener 1 has a first leg 3 and a second leg 5 that are connected together as a single piece by a connecting region 6. A nut 7 is arranged on the first leg 3. The nut is located on the side of the first leg 3 facing away from the second leg 5. The nut 7 is connected to the first leg 3 by webs 8, wherein the webs 8 have predefined breaking points that are not shown here. In addition, the fastener 1 has lateral tabs 10 on the second leg 5 which are inclined slightly toward the surface of the second leg 5 in the direction away from the first leg. The fastener 1 can be securely gripped at these tabs 10 when being released or installed.

Figure 2:
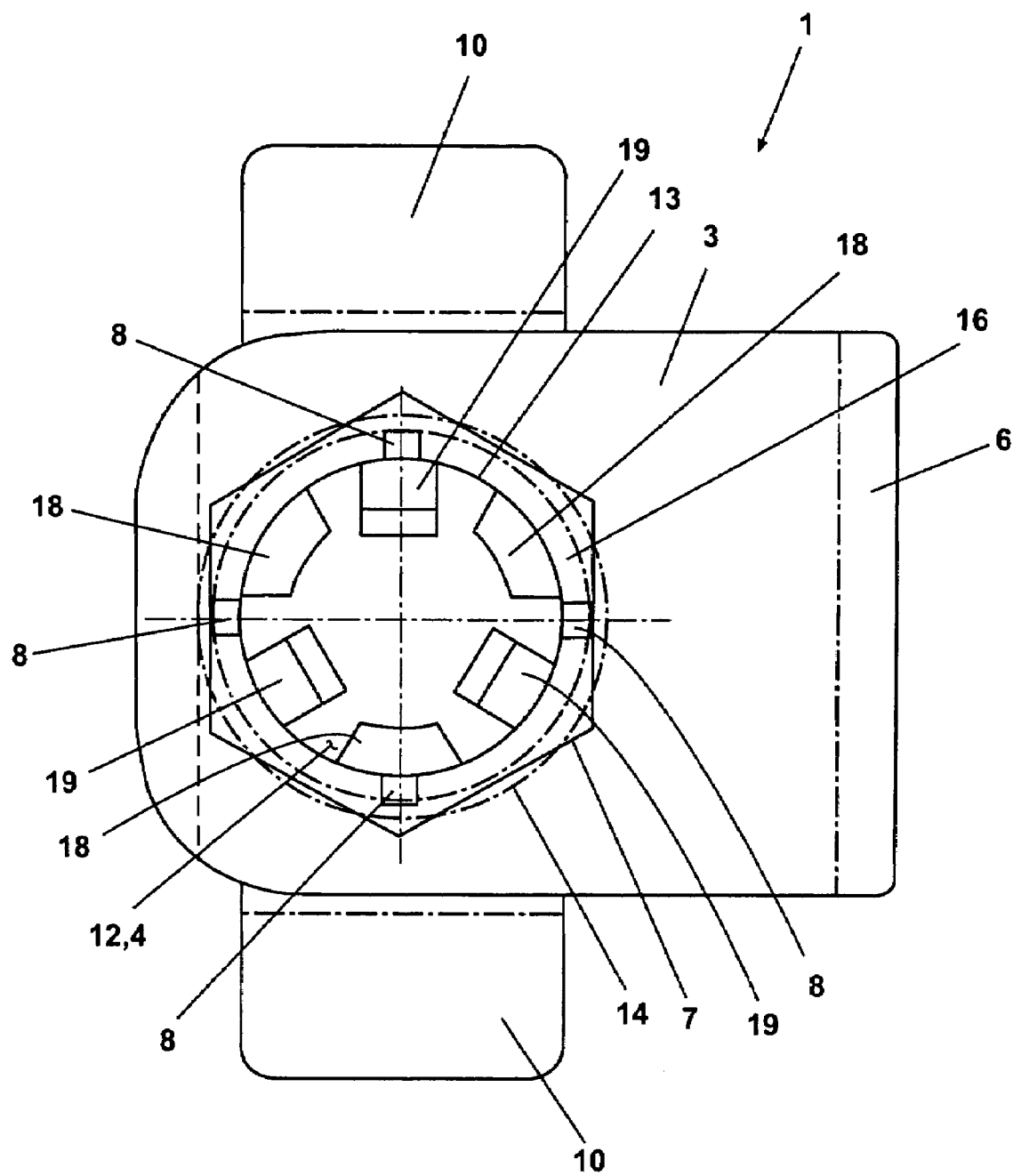
FIG. 2 is a top view of the fastener according to the invention.

FIG. 2 shows a top view of the fastener 1 according to the invention. Identical parts have identical reference numbers, as is also the case for the following drawings. The bore 12 that passes through the nut 7 can be seen especially clearly in this view. The bore 12 has an inner wall 13. The bore 12 is continued by a through hole 4 in the first leg 3 and the second leg 5, wherein the bore in the second leg 5 has a chamfer whose largest diameter 14 can be seen as a dashed line in this view. Between the elements inner wall 13 and largest diameter 14, shown as circles in this view, there can be seen an additional concentric dashed circle that represents the outer diameter of the centering projection 16, wherein the centering projection 16 is arranged on the side of the second leg 5 facing the first leg 3. Also shown as hidden are the webs 8 that are provided with predefined breaking points and connect the nut 7 to the first leg 3. Four webs are provided in this embodiment of the invention, although two, three, or more than four webs may also be used.

The webs 8 firstly connect the nut 7 and the first leg 3 and secondly are provided with the predefined breaking points such that the connection between the nut 7 and first leg 3 can be released by a separating force acting on the nut. A wrench could be used as the means for breaking the connection between the nut 7 and first leg 3.

In this example embodiment, webs 18 and tabs 19 are arranged on the inner wall 13 of the bore 12, which, when a pin or stud is introduced to establish the connection, engage in a groove of the thread of such a pin or stud, thus establishing the connection. In other example embodiments, the inner wall 13 may also be smooth or provided with a thread.

Figure 3:
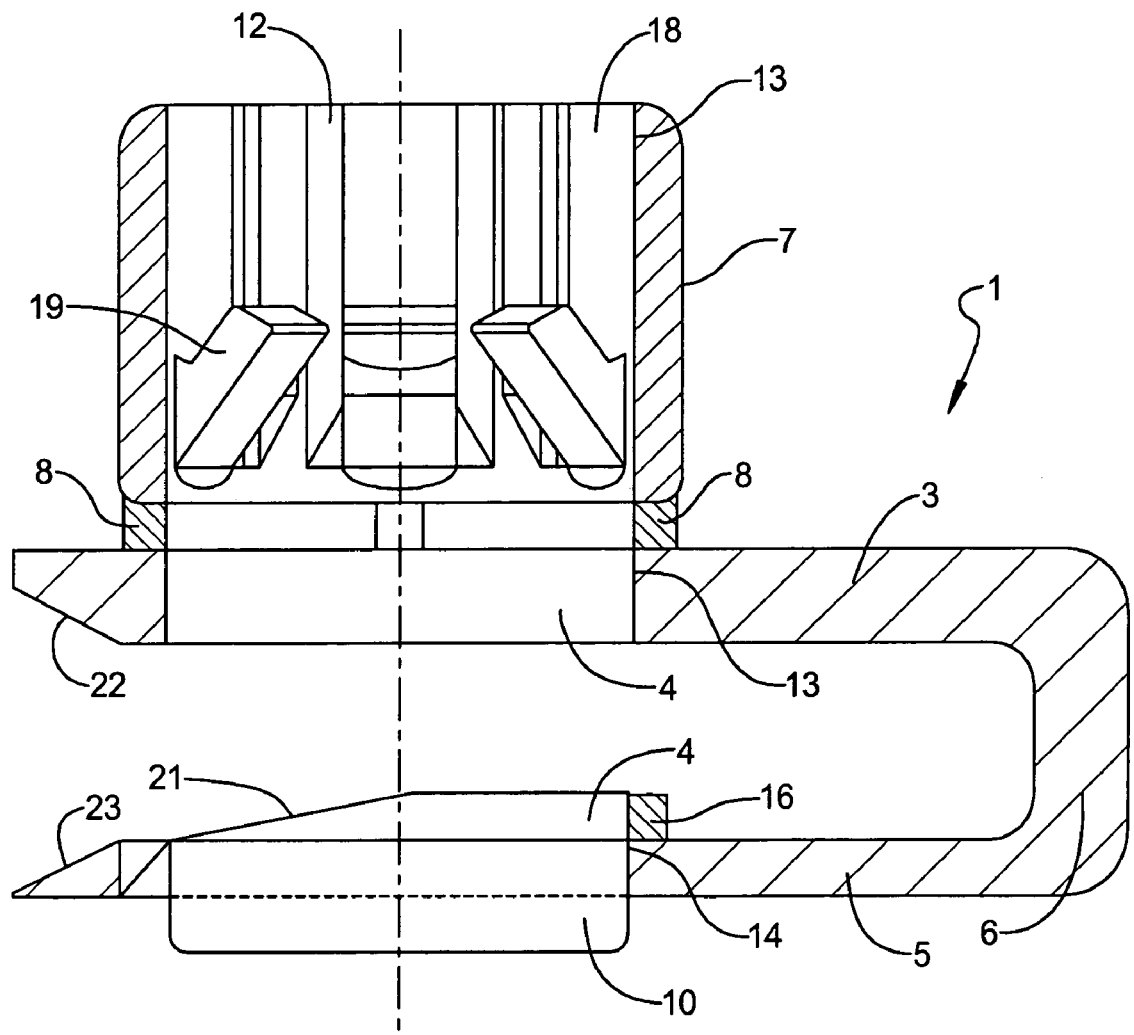
FIG. 3 is a cross sectional side view of the fastener according to the invention.

The fastener 1 is shown in a side view in FIG. 3, with the hidden elements once again shown in dashed lines. In this view, the shape of the finger-like elements 19 arranged on the inner wall 13 in the bore 12 is especially clearly visible. The fingers point inward at an angle and away from the first leg 3 so that when they engage in a groove in a pin or stud located in the bore 12, they prevent movement of this pin or stud. Pushing in of the pin or stud from the direction of the second leg 5 is not prevented.

Also clearly visible is the centering projection 16, which is arranged in the mounting hole of the component to be fastened and thus secures the fastener against sliding as long as no pin or stud is yet located in the bore 12 or the through holes 4. The fastener 1 has a chamfer 21 located on the side of the centering projection 16 that faces away from the connecting region 6. The chamfer 21 facilitates introduction of the component to be fastened. The first leg 3 and the second leg 5 likewise have chamfers 22, 23 on the side facing away from the connecting region 6, which perform the same function. In another embodiment that is not shown, the centering element may also be arranged on the first leg 3 on the side across from the second leg 5.

Figure 4:
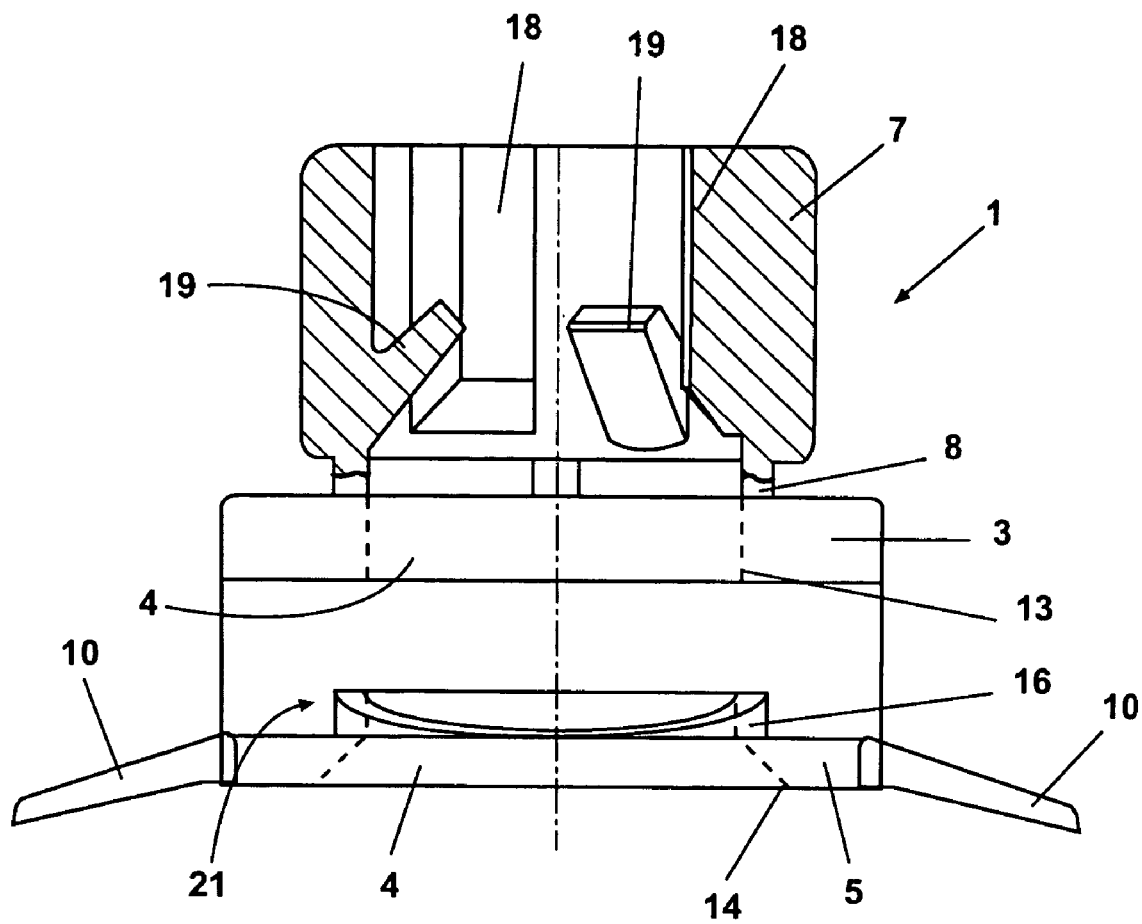
FIG. 4 a front view of the fastener according to the invention, where the nut is shown in cross-section.

FIG. 4 shows a front view of the fastener according to the invention, where a cross-section along the centerline is visible in the region of the nut 7. Clearly visible are the finger-like elements 19, which project into the bore of the nut 7 and are pointed in a direction facing away from the legs 3, 5. The chamfer 21 of the centering projection 16 is also clearly visible.

Figure 5:
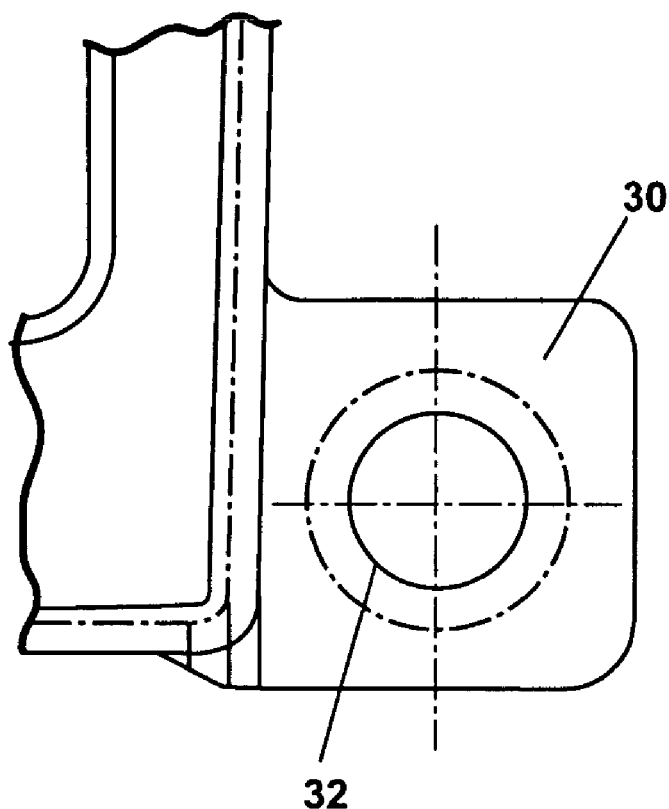
FIG. 5 front and side views of a component with a mounting hole for fastening by means of a fastener according to the invention.
Figure 6:
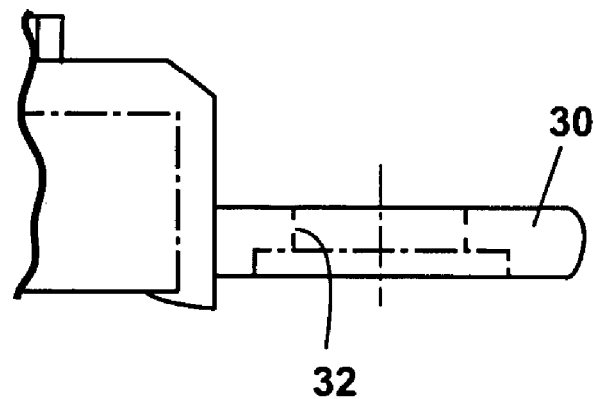
FIG. 6 is a side view of a component with a mounting hole for fastening by means of a fastener according to the invention.

FIGS. 5 and 6 show front and side views of a component that is to be fastened by means of a fastener according to the invention. Possible examples of such a component include interior trim of a motor vehicle or an element of a fitting or the like. The component 30 is designed as a tab in the vicinity of the mounting hole 32. However, it is not mandatory to provide a tab—the mounting hole can also be located directly on the interior trim or a fitting or the like. In the example embodiment shown in FIGS. 5 and 6, the mounting hole 32 has two different diameters wherein the area with the larger diameter serves to accommodate the centering element of the fastener.

Figure 7:
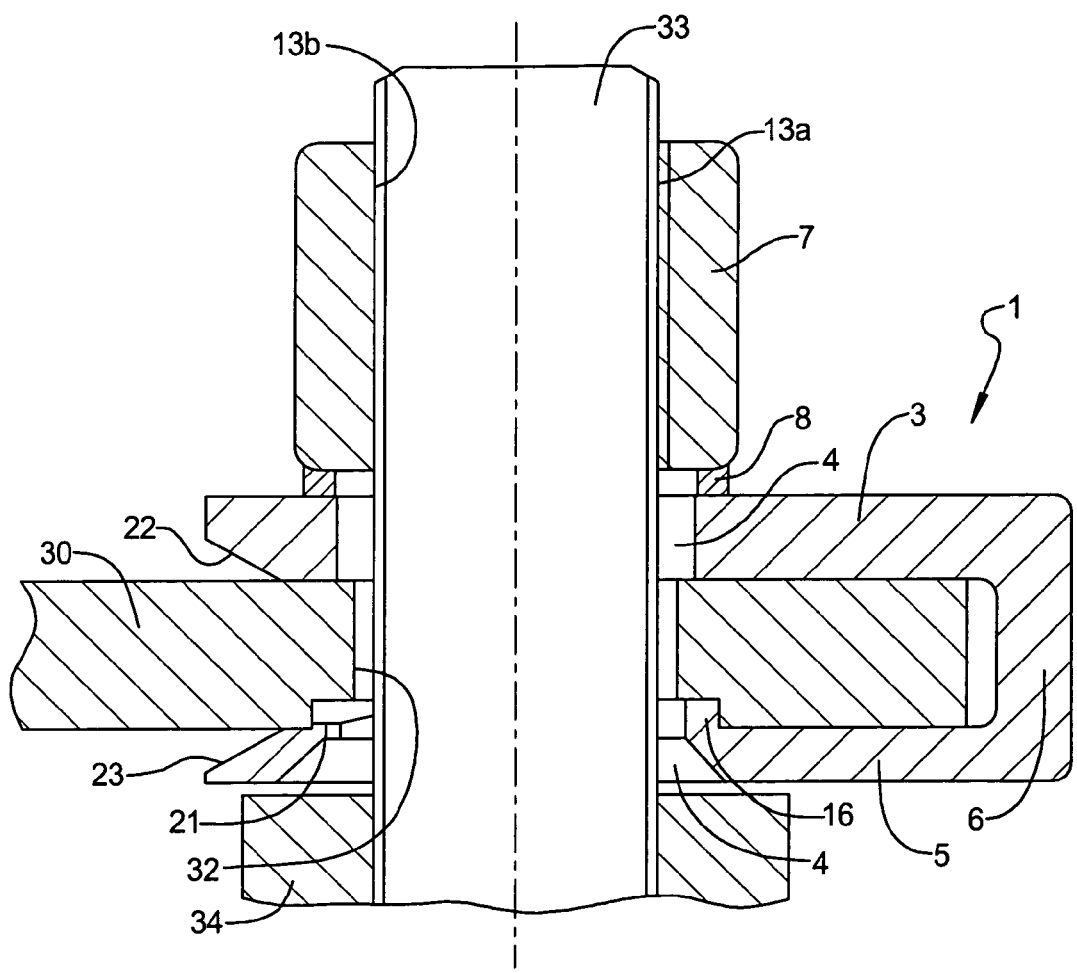
FIG. 7 a cross-section through another fastener according to the invention with a component and pin.

FIG. 7 shows the connection of a component 30 to another component 34 by means of a screw 33 and a fastener 1 according to the invention. In the example embodiment shown in FIG. 7, the nut 7 has a thread 13a shown to the right of the vertical axis that engages the thread of the screw 33 and in another embodiment as previously described in paragraph [0022] a smooth inner wall 13b shown to the left of the vertical axis.

The steps that are carried out to connect the components 30 and 34 using the fastener 1 and the screw 33 are described below. To this end, the fastener 1 is first placed on the component 30 such that the two legs 3, 5 grip around the component 30. In so doing, the through holes 4 of the two legs 3, 5 are arranged on both sides of the mounting hole 32 of the component 30. The centering projection 16 engages in the expanded part of the mounting hole 32 so that the fastener 1 is held on the component 30 without additional holding mechanisms. Introduction of the component 30 into the fastener 1 was made easier here by the chamfers 21, 22, 23. Next, the other component 34 is arranged on the second leg 5 on the side of the fastener 1 opposite the nut 7 such that the through hole of this component is located above the through hole 4 of the second leg of the fastener. Subsequently, the screw 33 is moved through the openings of the components 30, 34 and the fastener 1 and screwed into the bore of the nut so that the thread of the screw and nut interlock. It is also possible that the bore of the nut 7 initially has a smooth inner wall, and a thread is cut in the inner wall of the nut by the thread of the screw when the screw is introduced.

In another example embodiment, a pin or stud as connecting element can be attached to a base. The body of a motor vehicle may be such a base, for example. It is advantageous when the pin or stud is affixed to the base by welding. In this example embodiment, the fastening of a component to the pin or stud is desired. In this process, the fastener 1 is first placed on the component as described above. Next, the pin or stud, which preferably has a thread, is passed through the superimposed through holes of the fastener 4 and the component until the finger-like elements 19 located on the inner wall of the bore 12 of the nut 7 of the fastener engage in a groove of the thread of the pin or stud. The pin or stud is thus held fast in the nut 7.

To separate the nut 7 from the remaining parts of the fastener 1, in the example embodiments shown in FIGS. 1–4 and FIG. 7, a separating force in the form of a torque is used. A wrench is placed on the hexagon of the nut 7 and turned with a torque so that the predefined breaking points on the webs 8 are separated and the nut 7 is movable independently of the other parts of the fastener 1. The nut 7 can thus be removed from the pin or stud. Hence, the connection between the pin or stud and component can be released without the need for the end of the pin or stud opposite the nut to be accessible.

In further example embodiments, the separating force may also be a force acting in the direction of the axis of the pin or stud that is used to pull on the nut 7, where the direction of pull is away from the legs 3, 5. It is also possible to break the connection between the nut 7 and the first leg 3 by means of a cutting force.

In another example embodiment, when the pin or bolt and the nut have a thread, the nut can advantageously be detached when fastening the component in that a separating force is applied, with the nut subsequently retightened in the direction of the second leg. Within the scope of the invention, a screw is also considered to be a pin or bolt.

What is claimed is:

1. A fastener, comprising:
    a substantially U-shaped member having opposed first and second legs integrally joined by a connecting region;
    a through hole created in each of the legs, the through hole of the first leg being superimposed over the through hole of the second leg;
    a nut homogenously connected to the first leg on a first leg side facing away from the second leg by a plurality of frangible webs releasably attaching the nut to the first leg; and
    a bore created through the nut, the bore being coaxially aligned with the superimposed through holes of the first and second legs;
    wherein the nut is releasable from the first leg by a separating force rotationally acting on the nut operable to break the frangible webs.

2. The fastener of claim 1, wherein the bore further comprises a retention device operable to engage a tubular-shaped member slidably received through the through holes of the first and second legs and the bore.

3. The fastener of claim 2, wherein the retention device further comprises at least one internally arranged latching body operable to resiliently engage the tubular-shaped member.

4. The fastener of claim 3, wherein the retention device further comprises at least one male-shaped web.

5. The fastener of claim 2, wherein the retention device further comprises an internal thread.

6. The fastener of claim 1, wherein the second leg further includes a centering projection disposed external to the through hole of the second leg.

7. The fastener of claim 6, wherein the centering projection further comprises a chamfer facing away from the connecting region.

8. The fastener of claim 1, wherein the bore comprises a smooth surface adapted to receive a male thread of the tubular-shaped member.

9. The fastener of claim 1, wherein at least one of the first and second legs further comprises a chamfer facing away from the connecting region.

10. An automobile component fastening system, the fastening system comprising:
    a substantially U-shaped clamp having opposing first and second legs integrally joined by a connecting region;
    a coaxially alignable pair of through holes each created in one of the first and second legs;
    a nut attached to the first leg on a first leg side facing away from the second leg;
    a plurality of webs each operable to frangibly connect the nut to the first leg, the nut being releasable from the first leg by a separating force acting on the nut operable to break the webs;
    a first component having a fastener clearance aperture, the first component slidably engageable between the first and second legs such that the fastener clearance aperture is coaxially aligned with the pair of through holes; and
    a tubular-shaped member slidably received within each of the pair of through holes and the fastener clearance aperture and engageably received by the nut.

11. The system of claim 10, wherein the second leg includes a centering projection located between the first and second legs and projecting toward the first leg, the centering projection operable to align the fastener clearance aperture with the pair of through holes.

12. The system of claim 11, wherein the centering projection further comprises a chamfer facing away from the connecting region, the chamfer operable to assist entry of the component between the first and second legs.

13. The system of claim 10, wherein the nut further comprises a bore having an internal thread operable to engage the tubular-shaped member.

14. The system of claim 10, wherein the clamp further comprises at least one tab laterally extending from one of the legs.

15. The system of claim 10, wherein the at least one tab comprises an opposed pair of tabs laterally extending from the second leg.

16. The system of claim 10, wherein at least one of the legs includes a chamfer.

17. The system of claim 10, further comprising a second component adapted to receive the tubular-shaped member, the second component contacting the second leg on a second leg side facing away from the first leg and held in contact with the second leg when the tubular-shaped member is engaged with the nut.

18. The system of claim 10, wherein the nut further comprises a bore defining a bore wall having a plurality of latching bodies extending from the bore wall into the bore that resiliently engage the tubular-shaped member when the tubular-shaped member is located in the bore, the latching bodies being operable to inhibit movement of the tubular-shaped member toward the clamp, while permitting movement of the tubular-shaped member away from the clamp.

* * * * *